United States Patent
Blackwell

(10) Patent No.: US 9,511,700 B1
(45) Date of Patent: Dec. 6, 2016

(54) TABLE SYSTEM

(71) Applicant: Larry Blackwell, Dinwiddie, VA (US)

(72) Inventor: Larry Blackwell, Dinwiddie, VA (US)

( * ) Notice: Subject to any disclaimer, the term of this patent is extended or adjusted under 35 U.S.C. 154(b) by 0 days.

(21) Appl. No.: 14/745,000

(22) Filed: Jun. 19, 2015

(51) Int. Cl.
*A47B 23/00* (2006.01)
*B60N 3/00* (2006.01)
*B62D 33/06* (2006.01)

(52) U.S. Cl.
CPC .......... *B60N 3/001* (2013.01); *B62D 33/0612* (2013.01)

(58) Field of Classification Search
CPC ..... B60N 3/001; B60N 3/004; B62D 33/0612; A47B 31/06
USPC . 108/42, 44, 45; 296/24.3, 190.02; 220/505, 529; 224/402
See application file for complete search history.

(56) References Cited

U.S. PATENT DOCUMENTS

| | | | |
|---|---|---|---|
| 1,851,965 A * | 3/1932 | Bartholomae | A47B 96/025 108/137 |
| 2,657,810 A * | 11/1953 | Garrick | A47B 45/00 108/102 |
| 4,195,577 A * | 4/1980 | Gross | A47G 7/044 108/31 |
| 5,387,064 A | 2/1995 | Cardinal | |
| D376,578 S | 12/1996 | Redford | |
| 6,092,708 A * | 7/2000 | Rand | B60R 5/045 108/147.21 |
| 6,347,419 B1 | 2/2002 | Kurtz | |
| 6,386,412 B1 | 5/2002 | Konechne | |
| 6,733,060 B1 * | 5/2004 | Pavkov | B60R 5/04 108/110 |
| 6,942,269 B2 * | 9/2005 | Mains | B60N 3/001 108/44 |
| 7,021,701 B1 * | 4/2006 | Hoernle | B62D 33/0612 296/190.02 |
| D525,934 S | 8/2006 | Panasewicz et al. | |
| 7,398,737 B1 * | 7/2008 | Martellaro | B60N 3/001 108/143 |
| 7,481,328 B1 | 1/2009 | Van De Wege, I et al. | |
| 7,533,917 B2 | 5/2009 | Tung et al. | |
| 7,784,885 B2 * | 8/2010 | Steiger | B60P 3/14 108/106 |
| 8,117,972 B2 * | 2/2012 | Winget | A47B 96/02 108/108 |
| 8,720,991 B2 * | 5/2014 | Macleod | B60N 3/001 224/275 |
| 2003/0090117 A1 | 5/2003 | Cormier et al. | |
| 2007/0200392 A1 * | 8/2007 | Eiswirth | B60N 2/34 296/190.02 |
| 2008/0191515 A1 * | 8/2008 | Hollenbeck | B62D 33/0612 296/190.02 |
| 2013/0221696 A1 | 8/2013 | Quattrocolo et al. | |

* cited by examiner

*Primary Examiner* — Jose V Chen

(57) ABSTRACT

A table system includes a semi truck that has a sleeping cabin. A table has a first half that is slidably coupled to a second half. Thus, the table has an adjustable width thereby facilitating the table to extend along an entire width of the sleeping cabin. A plurality of locks is provided and each of the locks is rotatably coupled to the table such that each of the locks retains the table at a selected width.

9 Claims, 4 Drawing Sheets

TABLE SYSTEM

BACKGROUND OF THE DISCLOSURE

Field of the Disclosure

The disclosure relates to table devices and more particularly pertains to a new table device the may be positioned between a top bunk and a bottom bunk within a semi truck.

SUMMARY OF THE DISCLOSURE

An embodiment of the disclosure meets the needs presented above by generally comprising a semi truck that has a sleeping cabin. A table has a first half that is slidably coupled to a second half. Thus, the table has an adjustable width thereby facilitating the table to extend along an entire width of the sleeping cabin. A plurality of locks is provided and each of the locks is rotatably coupled to the table such that each of the locks retains the table at a selected width.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
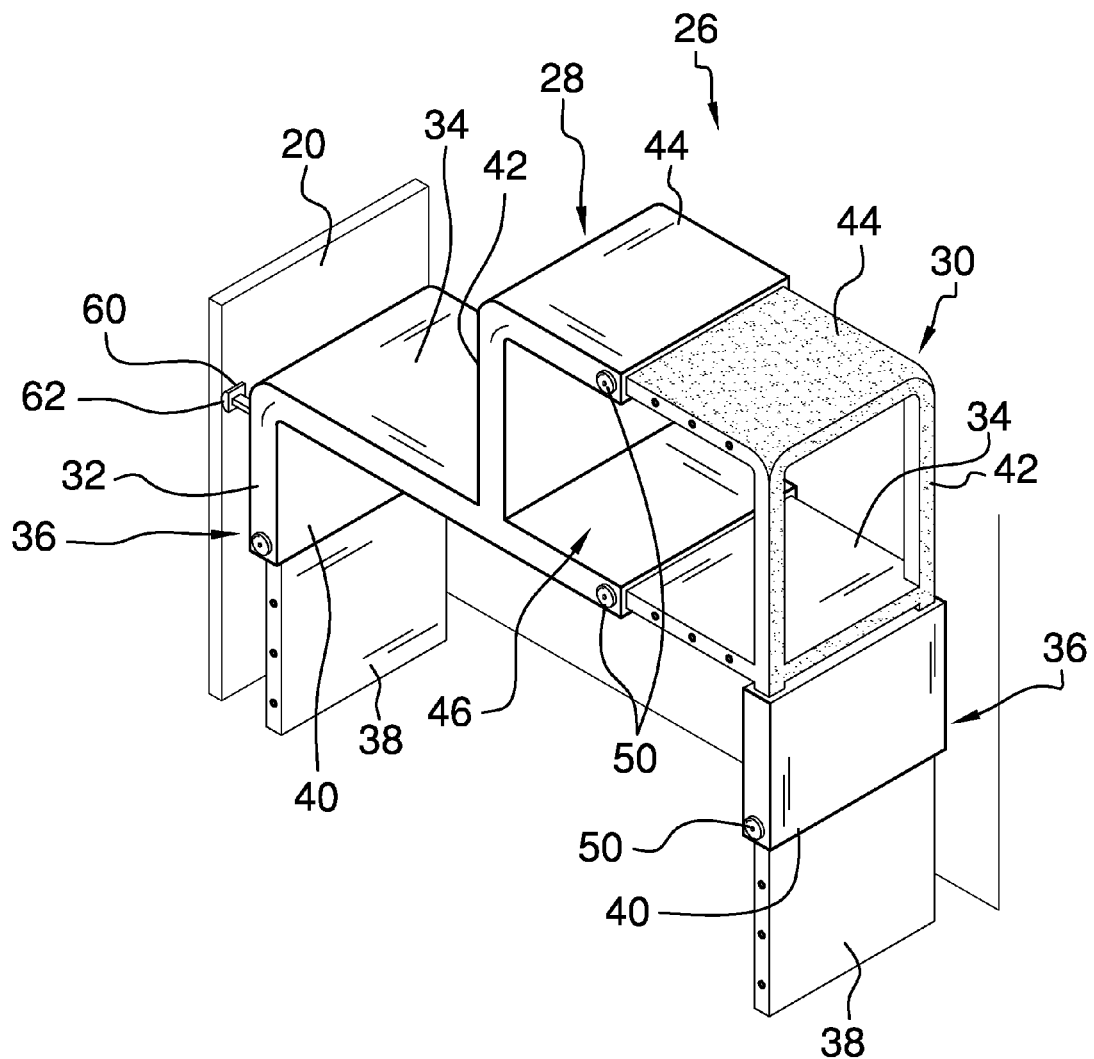
FIG. 1 is a perspective view of a table system according to an embodiment of the disclosure.
Figure 2:
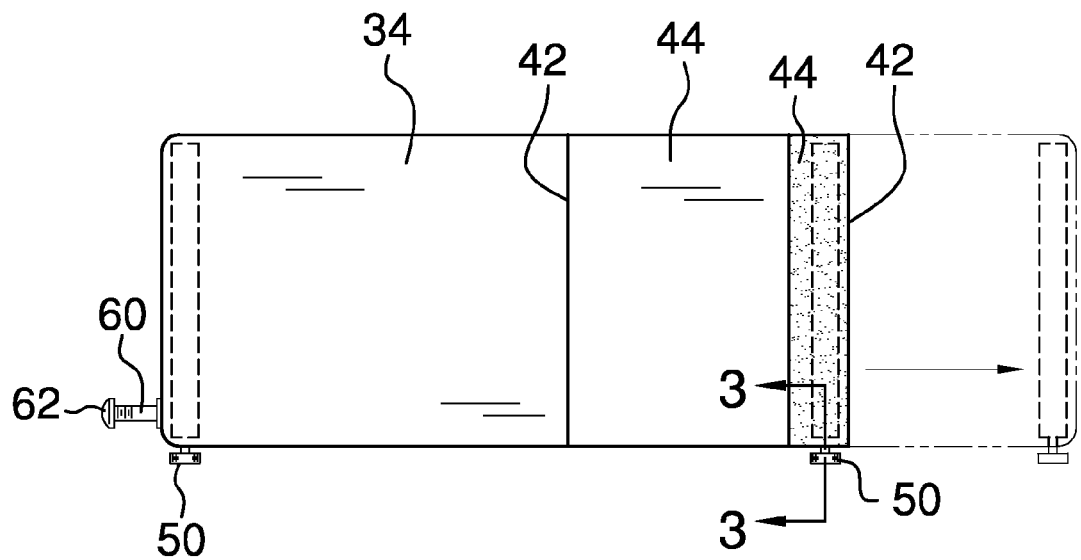
FIG. 2 is a top view of an embodiment of the disclosure.
Figure 3:
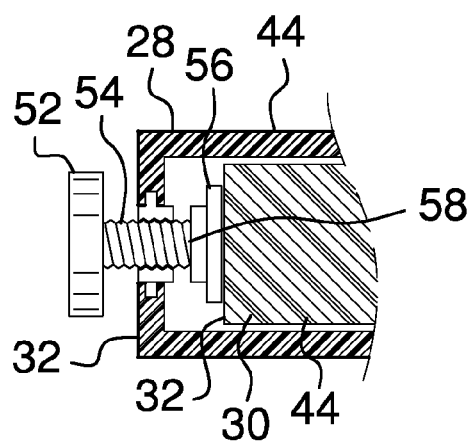
FIG. 3 is a cross sectional view of an embodiment of the disclosure.
Figure 4:
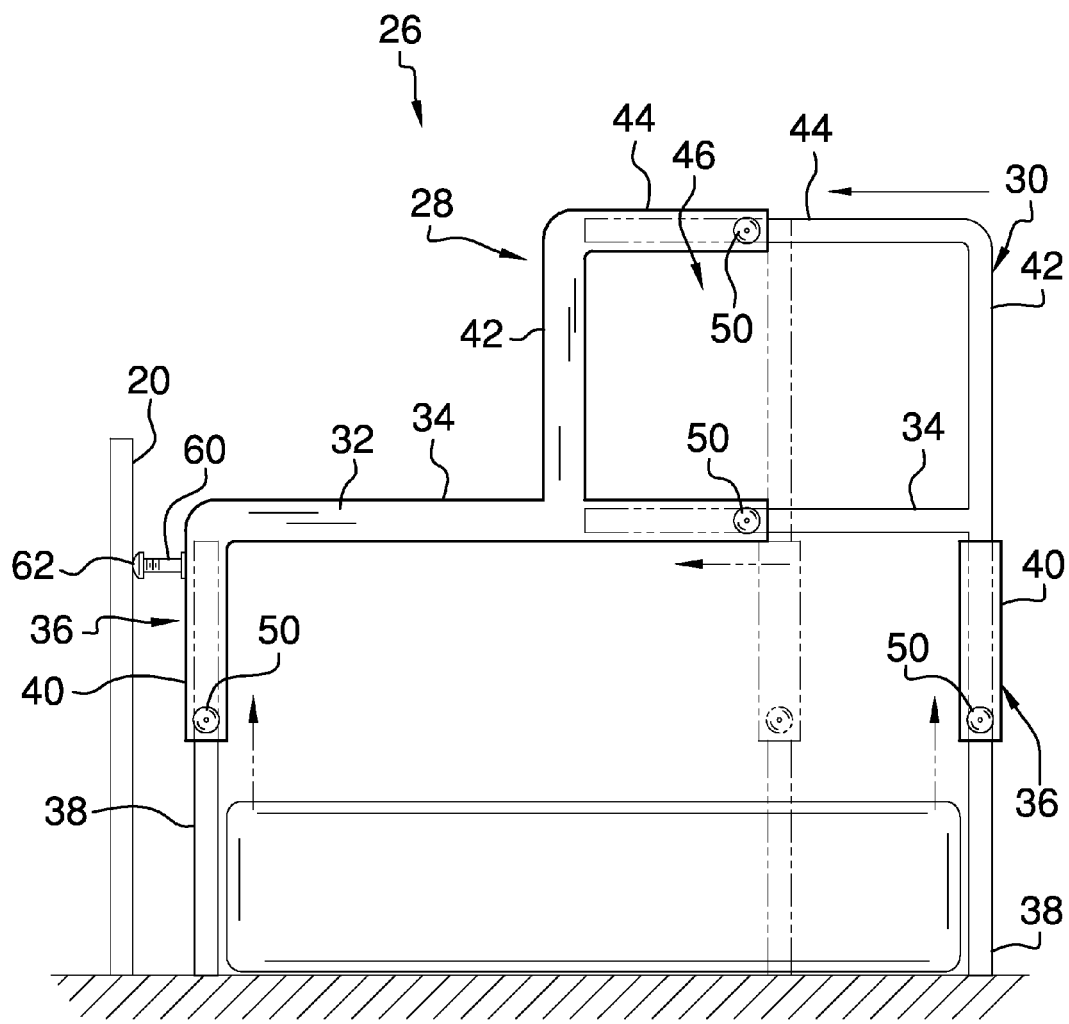
FIG. 4 is a front view of an embodiment of the disclosure.
Figure 5:
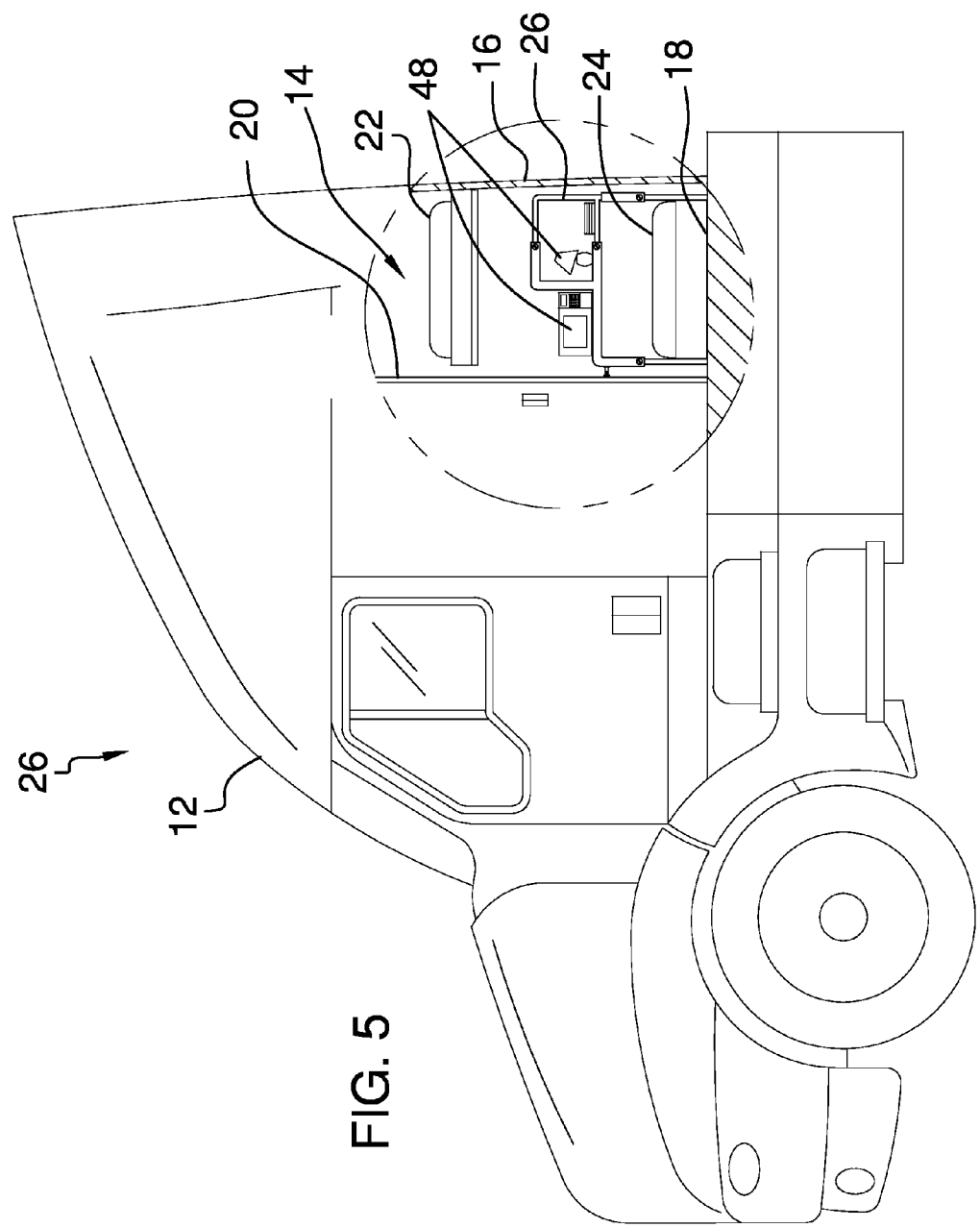
FIG. 5 is a perspective in-use view of an embodiment of the disclosure.

With reference now to the drawings, and in particular to FIGS. 1 through 5 thereof, a new table device embodying the principles and concepts of an embodiment of the disclosure and generally designated by the reference numeral 10 will be described.

As best illustrated in FIGS. 1 through 5, the table system 10 generally comprises a semi truck 12 that has a sleeping cabin 14 and the sleeping cabin 14 has a rear wall 16, a bottom wall 18, a cabinet 20, a top bunk 22 and a bottom bunk 24. The cabinet 20 is spaced from the rear wall 16 and the semi truck 12 may be a semi truck 12 of any conventional design. A table 26 is provided that has a first half 28 slidably coupled to a second half 30. Thus, the table 26 has an adjustable width thereby facilitating the table 26 to extend between the rear wall 16 and the cabinet 20. Each of the first half 28 and the second half 30 has a first lateral edge 32. The table 26 is positioned between the top bunk 22 and the bottom bunk 24.

Each of the first half 28 and the second half 30 includes a top portion 34 and a leg portion 36 forming an angle with respect to the top portion 34. The top portion 34 corresponding to the first half 28 slidably engages the top portion 34 corresponding to the second half 30. The leg portion 36 of each of the first half 28 and the second half 30 comprises a lower section 38 that is slidably coupled to an upper section 40 such that the leg portion 36 of each of the first half 28 and the second half 30 has an adjustable height. The lower section 38 of each of the first half 28 and the second half 30 abuts the bottom wall 18 of the sleeping cabin 14 such that the top portion 34 is spaced from the bottom wall 18. The leg portion 36 of each of the first half 28 and the second half 30 are spaced apart a selected distance from each other thereby facilitating the table 28 to straddle the bottom bunk 24.

Each of the first half 28 and the second half 30 further includes a first raised portion 42 and a second raised portion 44 forming an angle with respect to the first raised portion 42. The first raised portion 42 extends upwardly from the top portion 34 of an associated one of the first half 28 and the second half 30. The second raised portion 44 is spaced from the top portion 34 thereby defining a storage space 46 between the top portion 34 and the second raised portion 44. An object 48 may be positioned within the storage space and the object 48 may be a lamp, a book or other object.

The second raised portion 44 corresponding to the first half 28 slidably engages the second raised portion 44 corresponding to the second half 30. The first raised portion 42 corresponding to the second half 30 is aligned with the leg portion 36 corresponding to the second half 30. The first raised portion 42 corresponding to the second half 30 is open and the first raised portion 42 corresponding to the first half 28 is spaced from the leg portion 36 corresponding to the first half 28. Each of the first raised portion 42 and the second raised portion 44 corresponding to the second half 30 may be comprised of a resiliently compressible material. An object 48 may be positioned on the top portion 34 such that the object 48 is positioned between the first raised portion 42 corresponding to the first half 28 and the leg portion 36 corresponding to the first half 28. The object 48 may be a microwave over, a refrigerator or other appliance.

A plurality of locks 50 is provided and each of the locks 50 is rotatably coupled to the table 12 such that each of the locks 50 retains the table 12 at a selected width and each of the leg portions 36 at the selected height. Each of the locks 50 is positioned on the first lateral edge 32. The locks 50 are distributed on the upper section 40 of each of the first half 28 and the second half 30, the top portion 34 corresponding to the first half 28 and the second raised portion 44 corresponding to the first half 28. Each of the locks 50 comprises a knob 52, a shaft 54 extending away from the knob 52 and a pad 56 coupled to the shaft 54.

The shaft 54 has a distal end 58 with respect to the knob 52 and the pad 56 is positioned on the distal end 58. The shaft 54 extends through the first lateral edge 32 corresponding to an associated one of the upper section 40 of each of the first half 28 and the second half 30, the top portion 34 corresponding to the first half 28 and the second raised portion 44 corresponding to the first half 28. The shaft 54 threadably engages the first lateral edge 32 such that the shaft 54 extends inwardly and outwardly from the table 26 when the associated knob 52 is rotated in a respective locking direction and an unlocking direction. Thus, the pad 56 frictionally engages the first lateral edge 32 corresponding to an associated one of the lower section 38 of each of the first half 28 and the second half 30, the top portion 34 corresponding to the second half 30 and the second raised portion 44 corresponding to the second half 30 when the associated knob 52 is rotated in the locking direction.

A stop 60 is coupled to and extends away from the upper section 40 corresponding to the first half 28 and the stop 60 has a distal end 62 with respect to the upper section 40. The stop 60 has a threadably adjustable length such that the distal end 62 of the stop 60 frictionally engages the cabinet 20. The stop 60 prevents the table 26 from moving while the semi truck 12 is in motion.

In use, the table 26 is positioned within the sleeping cabin 14 to straddle the bottom bunk 24. The table 26 is manipulated to adjust the width of the table 26 and the locks 50 on the top portion 34 and the second raised portion 44 are manipulated to retain the table 26 at the selected width. The table 26 is further manipulated to adjust a height of each of the leg portions 36 and the locks 50 on the upper sections 40 are manipulated to retain the table 26 at the selected height. The stop 60 is manipulated to engage the cabinet 20 to prevent the table 26 from moving.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A table system comprising:
   a semi truck having a sleeping cabin;
   a table having a first half being slidably coupled to a second half such that said table has an adjustable width thereby facilitating said table to extend along an entire width of said sleeping cabin;
   a plurality of locks, each of said locks being rotatably coupled to said table such that each of said locks retains said table at a selected width; and
   wherein each of said first half and said second half further includes
      a top portion;
      a first raised portion; and
      a second raised portion forming an angle with respect to said first raised portion, said first raised portion extending upwardly from said top portion of an associated one of said first half and said second half such that said second raised portion is spaced from said top portion thereby defining a storage space between said top portion and said second raised portion, said second raised portion corresponding to said first half slidably engaging said second raised portion of said second half.

2. The system according to claim 1, wherein each of said first half and said second half has a first lateral edge, each of said first half and said second half including
   a top portion; and
   a leg portion forming an angle with respect to said top portion, said top portion corresponding to said first half slidably engaging said top portion corresponding to said second half.

3. The system according to claim 2, wherein said leg portion of each of said first half and said second half comprising a lower section being slidably coupled to an upper section such that said leg portion of each of said first half and said second half has an adjustable height, said lower section of each of said first half and said second half abutting said bottom wall of said sleeping cabin such that said top portion is spaced from said bottom wall.

4. The system according to claim 1, wherein:
   each of said first half and said second half has a leg portion; and
   said first raised portion corresponding to said second half being aligned with said leg portion corresponding to said second half, said first raised portion corresponding to said second half having an opening extending therethrough wherein said first raised portion corresponding to said second half is open, said first raised portion of said first half being spaced from said leg portion corresponding to said first half.

5. The system according to claim 1, wherein:
   each of said first half and said second half has a first lateral edge, an upper section, a top portion and a second raised portion; and
   each of said locks being positioned on said first lateral edge, said locks being distributed on said upper section of each of said first half and said second half, said top portion corresponding to said first half and said second raised portion corresponding to said first half.

6. The system according to claim 1, wherein each of said locks comprises:
   a knob;
   a shaft extending away from said knob, said shaft having a distal end with respect to said knob; and
   a pad being coupled to said distal end.

7. The system according to claim 6, wherein:
   each of said first half and said second half has a first lateral edge, an upper section, a lower section, a top portion and a second raised portion; and
   said shaft extends through said first lateral edge corresponding to an associated one of said upper section of each of said first half and said second half, said top portion corresponding to said first half and said second raised portion corresponding to said first half, said shaft threadably engaging said first lateral edge.

8. The system according to claim 7, wherein said pad frictionally engages said first lateral edge corresponding to an associated one of said lower section of each of said first half and said second half, said top portion corresponding to said second half and said second raised portion corresponding to said second half.

9. A table system comprising:
   a semi truck having a sleeping cabin, said sleeping cabin having a rear wall, a bottom wall and a cabinet, said cabinet being spaced from said rear wall, said front side being open;
   a table having a first half being slidably coupled to a second half such that said table has an adjustable width thereby facilitating said table to extend between said rear wall and said cabinet, each of said first half and said second half having a first lateral edge, each of said first half and said second half including:
- a top portion, and
- a leg portion forming an angle with respect to said top portion, said top portion corresponding to said first half slidably engaging said top portion corresponding to said second half, said leg portion of each of said first half and said second half comprising a lower section being slidably coupled to an upper section such that said leg portion of each of said first half and said second half has an adjustable height, said lower section of each of said first half and said second half abutting said bottom wall of said sleeping cabin such that said top portion is spaced from said bottom wall;

each of said first half and said second half further including:
- a first raised portion, and
- a second raised portion forming an angle with respect to said first raised portion, said first raised portion extending upwardly from said top portion of an associated one of said first half and said second half such that said second raised portion is spaced above said top portion thereby defining a storage space between said top portion and said second raised portion, said second raised portion corresponding to said first half slidably engaging said second raised portion of said second half, said first raised portion corresponding to said second half being aligned with said leg portion corresponding to said second half, said first raised portion corresponding to said second half having an opening extending therethrough wherein said first raised portion corresponding to said second half is open, said first raised portion of said first half being spaced from said leg portion corresponding to said first half; and a plurality of locks, each of said locks being rotatably coupled to said table such that each of said locks retains said table at a selected width, each of said locks being positioned on said first lateral edge, said locks being distributed on said upper section of each of said first half and said second half, said top portion corresponding to said first half and said second raised portion corresponding to said first half, each of said locks comprising:
- a knob,
- a shaft extending away from said knob, said shaft having a distal end with respect to said knob, said shaft extending through said first lateral edge corresponding to an associated one of said upper section of each of said first half and said second half, said top portion corresponding to said first half and said second raised portion corresponding to said first half, said shaft threadably engaging said first lateral edge, and
- a pad being coupled to said distal end, said pad frictionally engaging said first lateral edge corresponding to an associated one of said lower section of each of said first half and said second half, said top portion corresponding to said second half and said second raised portion corresponding to said second half.

\* \* \* \* \*